United States Patent [19]
Okamoto et al.

[11] Patent Number: 5,384,778
[45] Date of Patent: Jan. 24, 1995

[54] COMMUNICATION CONTROL APPARATUS

[75] Inventors: Yasushi Okamoto; Akiya Arimoto, both of Itami, Japan

[73] Assignee: Mitsubishi Denki Kabushiki Kaisha, Tokyo, Japan

[21] Appl. No.: 130,254

[22] Filed: Oct. 1, 1993

[30] Foreign Application Priority Data

Oct. 20, 1992 [JP] Japan .................................. 4-281663

[51] Int. Cl.$^6$ ............................ H04J 3/12; H04L 1/16
[52] U.S. Cl. .................................. 370/85.3; 370/85.6; 340/825.52; 371/68.2
[58] Field of Search .................... 370/85.1, 85.2, 85.3, 370/85.6; 340/825.5, 825.51, 825.52; 371/20.1, 68.2, , 33

[56] References Cited

U.S. PATENT DOCUMENTS

| 4,715,031 | 12/1987 | Crawford et al. | 370/85.6 |
| 5,090,012 | 2/1992 | Kajiyama et al. | 370/85.3 |
| 5,214,647 | 5/1993 | Komatsu | 370/85.3 |
| 5,274,638 | 12/1993 | Michihira et al. | 370/85.6 |

FOREIGN PATENT DOCUMENTS 0241018 10/1987 European Pat. Off. .
0319271 6/1989 European Pat. Off. .
0367177 5/1990 European Pat. Off. .
60-059847 8/1985 Japan .

OTHER PUBLICATIONS

Draft; SAE Recommended Practice J1850; Class B Data Communication Network Interface, U.S. Automobile Engineering Association, Jun. 21, 1991.

Primary Examiner—Melvin Marcelo
Attorney, Agent, or Firm—Lowe, Price, LeBlanc & Becker

[57] ABSTRACT

A communication control apparatus is constituted such that, when functioning as a receiving side, an IFR 20 is replied only when receiving normally or only when not receiving normally, also at the time of multiple address communication, when functioning as the receiving side, the IFR 20 is replied only when receiving normally or only when not receiving normally, and furthermore, at the time of multiple address communication, a reply data row is replied only when an IFR control code 57 sent from a transmitting side is larger than respective source addresses, or only when smaller. It is possible to find out occurrence of errors in a unit on the transmitting side, by one frame communication, and accuracy of the multiple address communication is improved, besides the source address of the unit having an unspecific source address can be retrieved easily in one specific unit.

5 Claims, 20 Drawing Sheets

Fig. 3(a) Prior Art   BIT "1"

Fig. 3(b) Prior Art   BIT "0"

Fig.6(a) Prior Art FRAME ON COMMON DATA LINE

Fig.6(b) Prior Art TRANSMITTING FRAME OF A UNIT

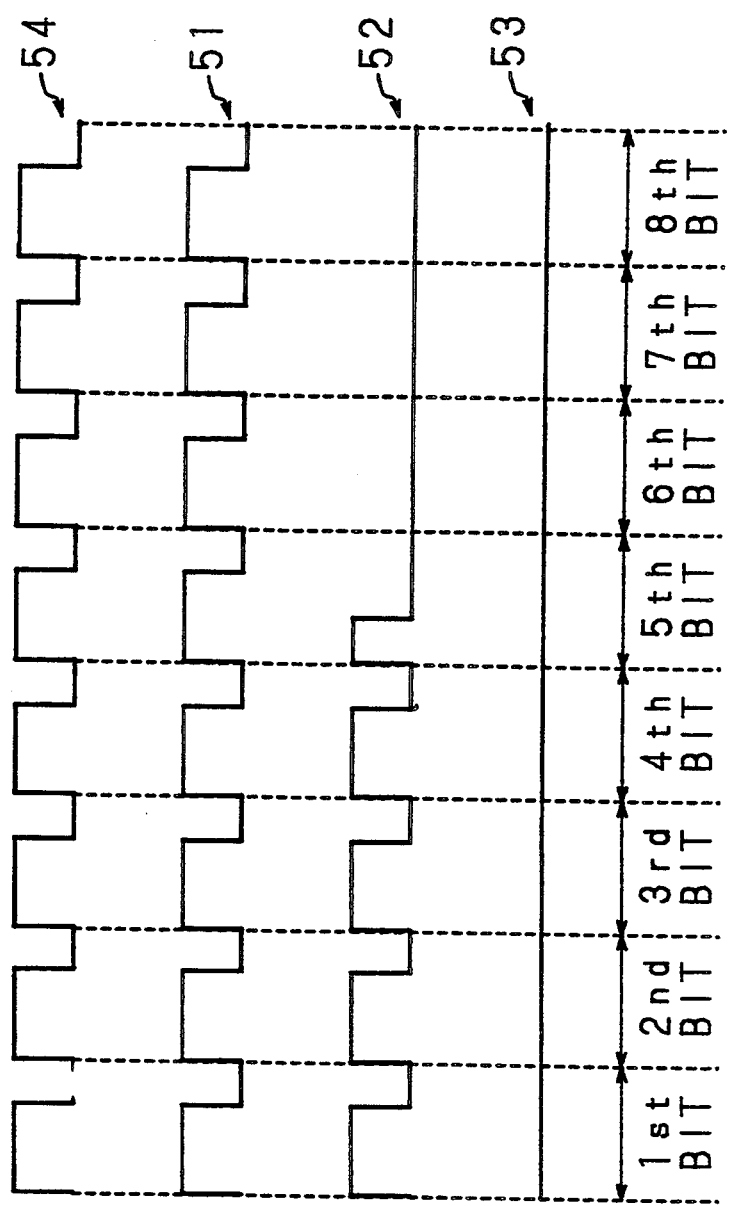

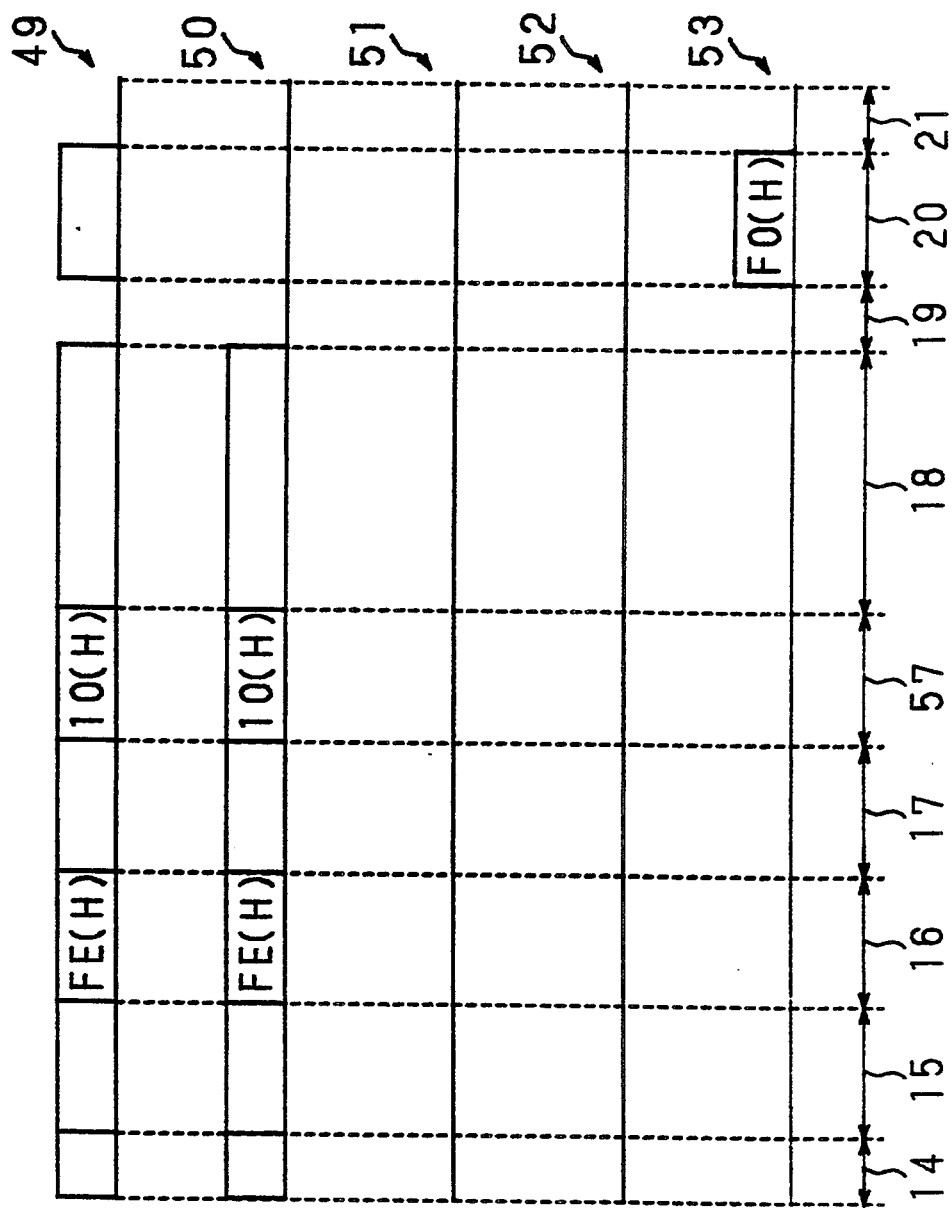

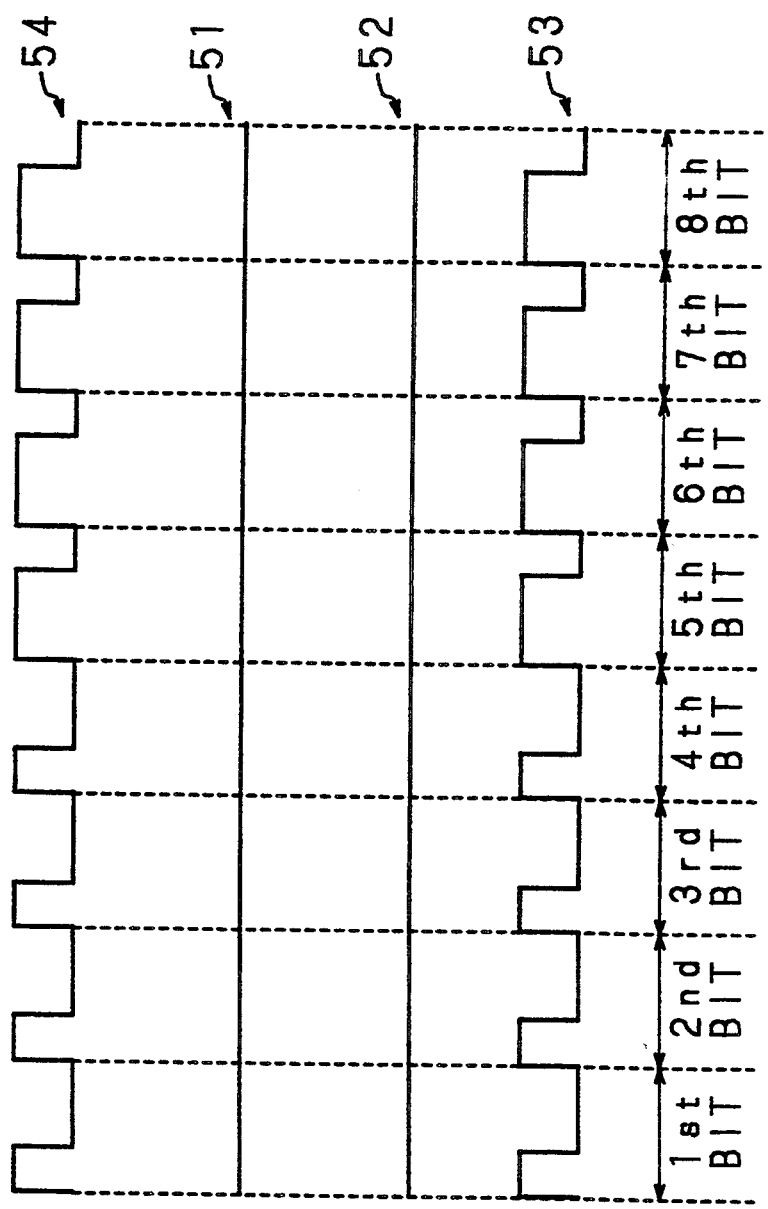

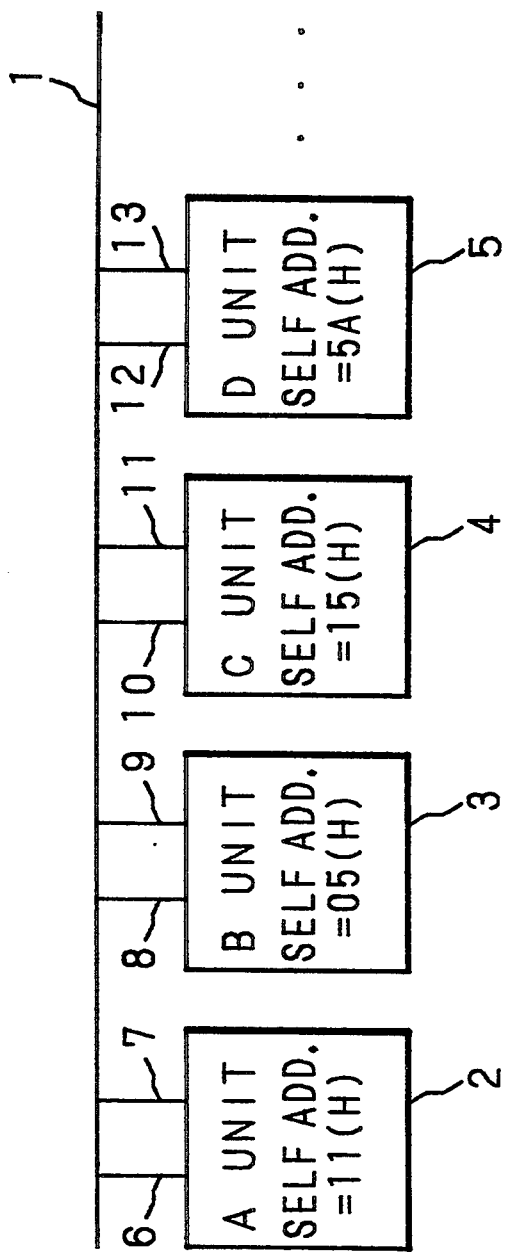

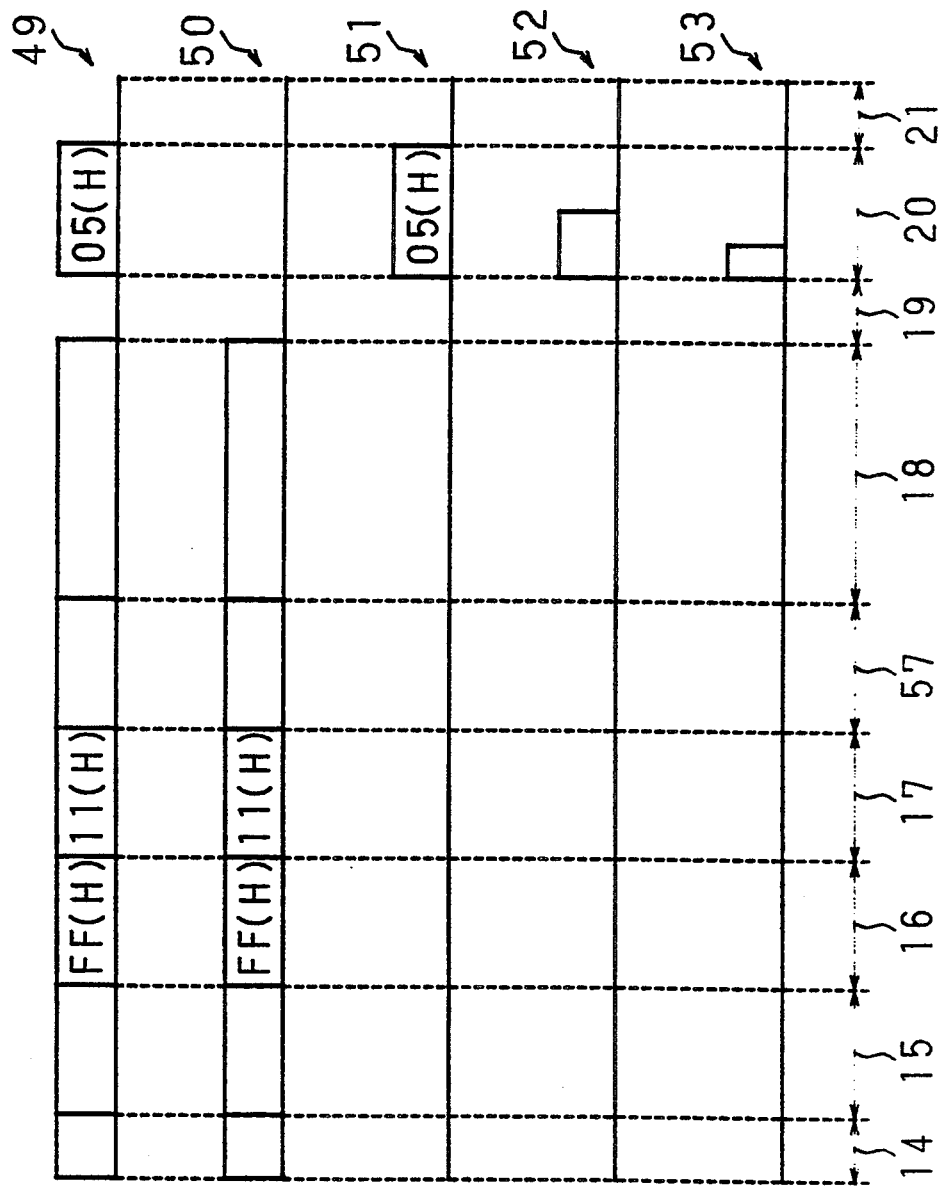

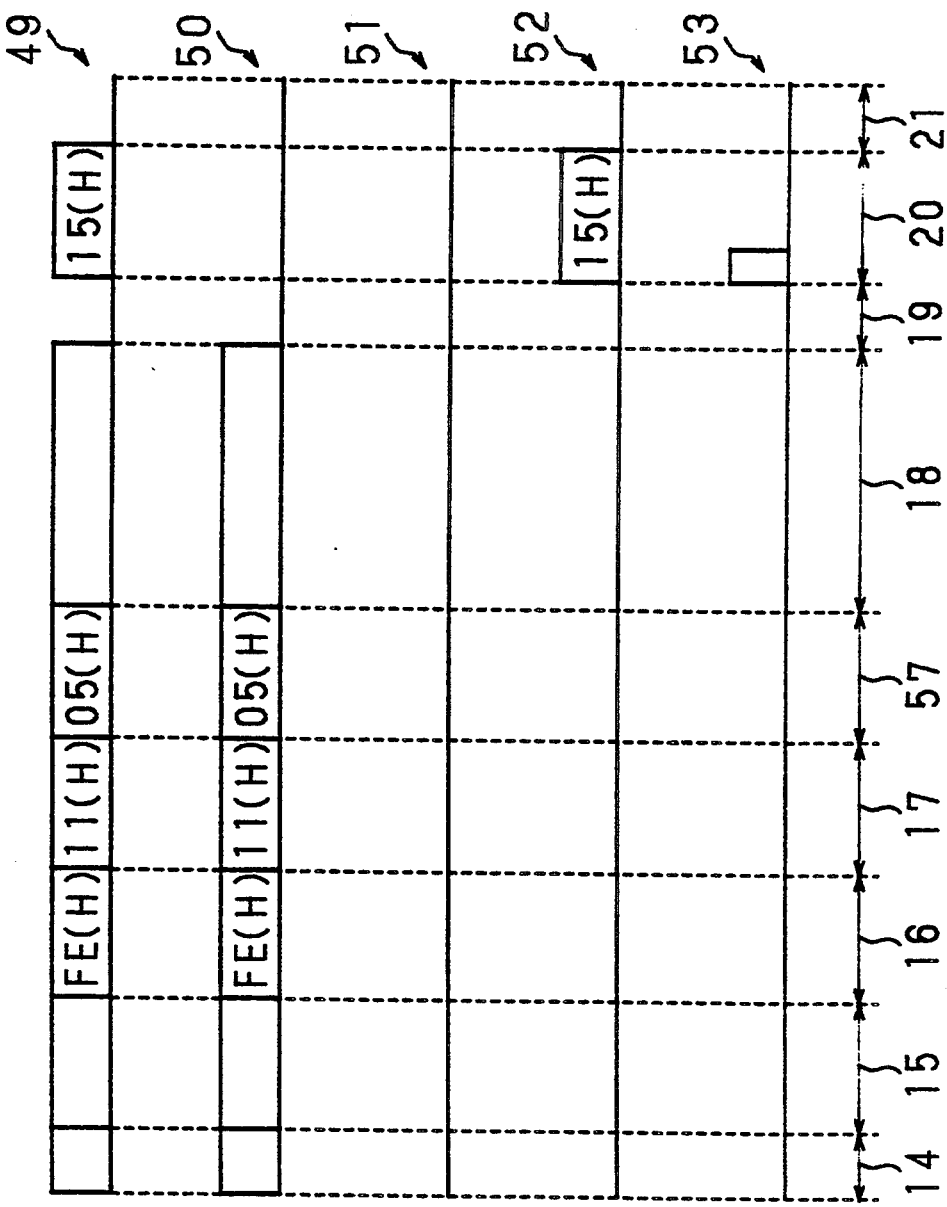

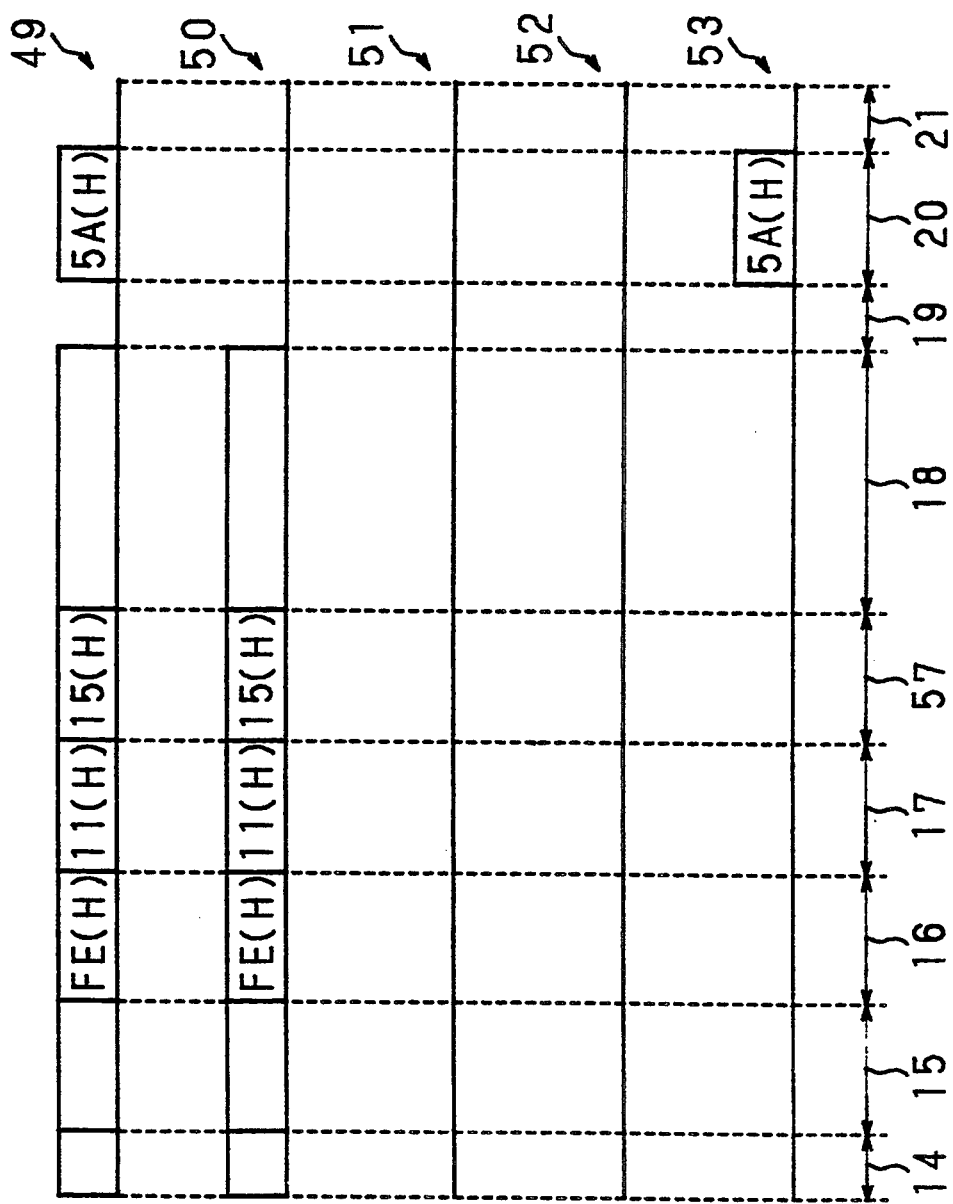

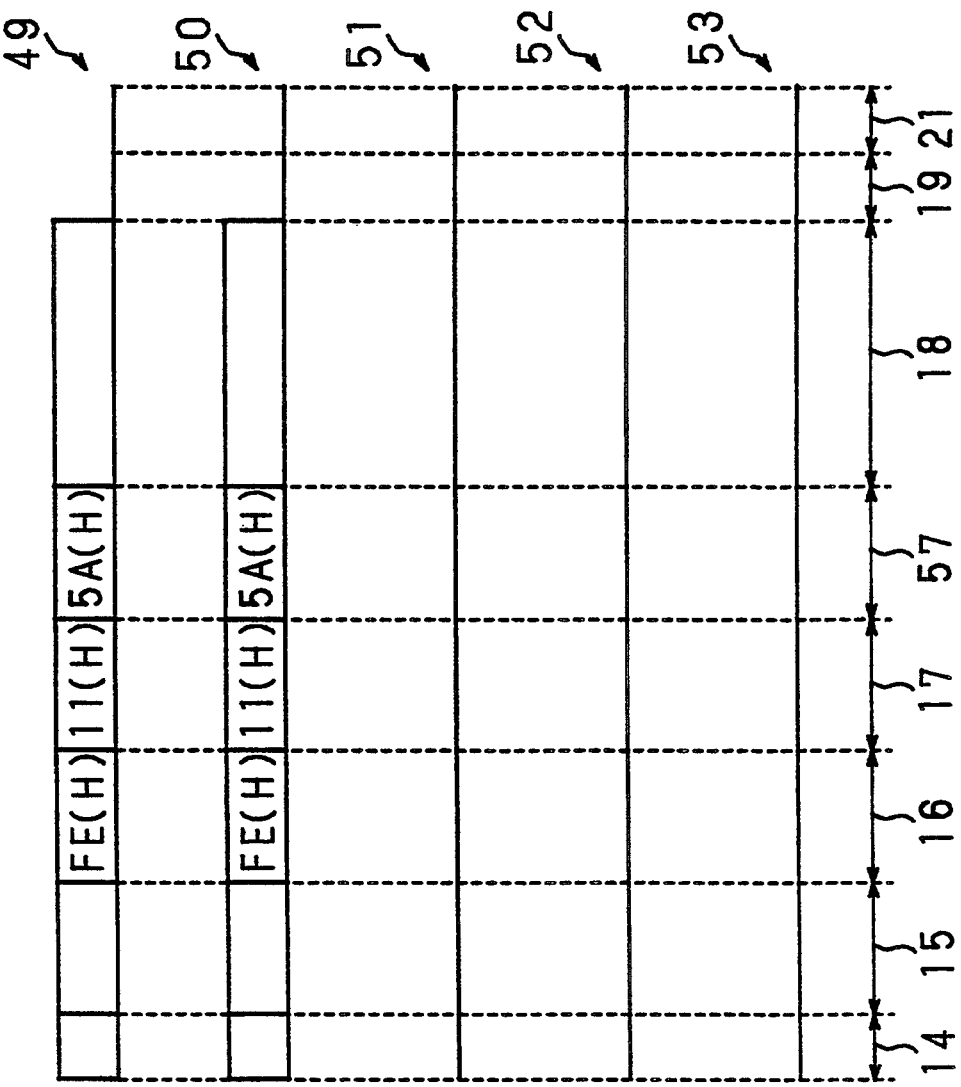

COMMUNICATION CONTROL APPARATUS

BACKGROUND OF THE INVENTION

1. Field of the Invention

The present invention relates to a communication control apparatus which controls data communication, and particularly, to a communication control apparatus by a CSMA/CD (carrier Sense Multiple Access with Collision Detection) method which is one accessing method of a LAN (Local Area Network).

2. Description of the Related Art

In a LAN, since a bus contention control is introduced to avoid collisions of data being sent out from a plurality of terminal apparatus, a CSMA/CD method is frequently used as an accessing method. A communication system by a conventional communication control apparatus adopting the CSMA/CD method is described with reference to FIG. 1 and FIG. 2.

FIG. 1 is a schematic view showing an example of a connection between conventional communication apparatus 2, 3, 4 and 5 (hereinafter referred to as A, B, C and D units) each having a bus contention control function by the CSMA/CD accessing method, and a common data line 1. The units 2, 3, 4 and 5 are respectively connected to the common data line 1 through transmitting lines designated by reference numerals 6, 8, 10 and 12, and receiving lines designated by the reference numerals 7, 9, 11 and 13 in the figure, thus constituting a communication system.

An example of a communication format used in such a communication system is shown in a schematic view of Fie. 2. The communication format shown in FIG. 2 is a format published by the U.S. Automobile Engineering Association as SAE-J 1850.

This communication format is constituted by a transmit start mark 14 which transfers a transmit start to all of the units connected to the common data line 1, a priority code 15 which decides priority at the time of collision in a bus contention control method, destination address 16 showing a transmitting destination, a source address 17 showing a transmitting source, a communication data area 18, an error detection code (hereinafter, referred to as a CRC) 18b showing the CRC operation result from the first bit of the priority code 15 to a final bit of the communication data area 18, an area (hereinafter, referred to as an EOD) 19 showing completion of communication data, an area (hereinafter referred to as an IFR) 20 which is replied to a transmitting unit when normally received at a receiving unit, and an area (hereinafter, referred to as an EOF) 21 showing completion of a communication frame. The priority code 15, destination address 16 and source address 17 are generally called a communication control area 22.

Hereupon, a specific communicating procedure in the case where the A unit 2 sends out the transmitting frame to the common data line 1 against the D unit 5 in FIG. 1 is described.

Inherent addresses (hereinafter, referred to as the source address or inherent data) are allocated respectively to the units 2, 3, 4 and 5 connected to the common data line 1. Thus, when the A unit 2 transfers data to the D unit 5, as shown in FIG. 2, the destination address 16 in the transmitting frame 50 sent by the A unit 2 becomes the source address of the D unit 5. And, as shown in FIG. 2, the D unit 5 conducts receiving processing i.e., operates in a receiving mode when the destination address 16 in a frame 49 on the common data line 1 coincides with the source address allocated to itself. Also, the source address 17 in the transmitting frame 50 sent by the A unit 2 becomes the source address allocated to the A unit 2. Thereby, the A unit 2 informs the D unit 5 that the transmitting source of the transmitting frame 49 on the common data line 1 is the A unit 2 itself.

In such a manner, as shown in FIG. 2, when the A unit 2 sends out all data constituting the transmitting frame 50 to the common data line 1, the D unit 5, when receiving normally, after detecting the EOD 19, replies with the source address of its own with the IFR 20 as a reply IFR 53 as shown in FIG. 2. And, when the EOF 21 showing the completion of communication frame is detected, the transmission of one communication frame is completed.

In a manner described above, the frame 49 as shown in FIG. 2 is sent to the common data line 1.

Next, a bit format, in which a signal representing bits of "1" or "0" constituting the aforementioned communication format is subjected to pulse width modulation (hereinafter, referred to as a PWM), is described with reference to a wave-form diagram of FIG. 3.

An area 26 of each one bit is constituted by a first time 23, a second time 24 and a third time 25. As shown in FIG. 3(a), the bit "1" is so represented that, the first time 23 is high level (hereinafter, referred to as "H" ), and the second time 24 and the third time 25 are low level (hereinafter, referred to as "L"). The bit "0" is so represented that, as shown in FIG. 3(b), the first time 23 and the second time 24 are given at "H" and the third time 25 is "L". A row of bits constitutes a byte.

Next, the operation of the bus contention control using the communication format described above is described with reference to a timing chart of FIG. 4 and a wave-form diagram of FIG. 5.

As shown in FIGS. 4(b) and (c), when the A unit 2 and the B unit 3 simultaneously send out the transmitting frames 50 and 51 to the common data line 1, though the bus contention control detects the collisions by the priority codes 15 of the transmitting frames 50 and 51, priority of the common data line 1 is competed in this case.

Here, a timing chart of the communication when the A unit 2 obtains the priority and sends the transmitting frame 50 as shown in FIG. 4(b) is shown. Though the C unit 4 replies the IFR 20 as the reply IFR 52 as shown in FIG. 4(d) this is because that the destination address 16 in the transmitting frame 50 of the A unit 2 coincides with the source address of the C unit 4, and the C unit 4 moves to the receiving processing and detects the normal receiving.

An area of the priority code 15 in this case is shown in FIG. 5 with reference to the bit format.

Here, it is assumed that wave forms of the units output "H" as the signal level appear on the common data line 1. That is, outputs from the units 2, 3, 4 and 5 become the wired OR wave forms on the common data line 1.

In an example shown in FIG. 5, the A unit 2 sends out a "00(H)" (here, (H) indicates a hexadecimal) 62 to the common data line 1 having the specification as stated above, as the priority code 15 as shown in FIG. 5(b), and the B unit 2 sends out a "0F(H)" 63 as shown in FIG. 5(c). Now, since the "00(H)" is "00000000" in a binary code and the "0F(H)" is "00001111", as shown in FIG. 5, the collision occurs at a Fifth bit of the priority code 15 sent out respectively by the A unit 2 and the B unit 3. In this case, the wave form having longer "H" level, or the "H" level of the fifth bit of the wave Form 62 outputted from the A unit 2 shown in FIG. 5(b) appears on the common data line 1, as a wave form 61 of the priority code 15 as shown in FIG. 5(a).

While, in this case, the B unit 3 detects that the wave form 63 of "0F(H)" outputted by itself does not appear on the common data line 1, by comparing a wave form inputted to itself from the common data line 1 via the receiving line 9, with a wave form outputted to the common data line 1 by itself (hereinafter, referred to as an echo back comparison) to detect the collisions, and stops to send out the transmitting frame 51 thereafter as shown in FIG. 4(c).

The bus contention control is realized in the above-mentioned manner.

A communication system using the bus contention control as described above, may also employ a communication method called a multiple address communication. In the following, the multiple address communication is described according to a timing chart of the communication example shown in FIG. 6.

Now, assuming that the A unit 2 in FIG. 1 transmits the same data simultaneously to all of the other units, that is, the B unit 3, C unit 4 and D unit 8 connected to the common data line 1, as the destination address 16 of the transmitting frame 50 of the A unit 2 shown in FIG. 6(b), a multiple address communication code decided in the communication system in advance is outputted. For example, in the case of communication system in which all of the other units are designed to receive when "FF(H)" is outputted as the destination address, the "FF(H)" becomes the multiple address communication code. And, the B unit 3, C unit 4 and D unit 5 connected to the common data line 1 switch to the receiving made (hereinafter, referred to as a multiple address receiving) at the time point when it detects that the destination address of the transmitting frame 50 outputted from the A unit 2 to common data line 1 is the "FF(H)".

The B unit 3, C unit 4 and D unit 5 thusly switched to the multiple address receiving processing never reply the IFR 20 as shown in FIG. 6(a), regardless of occurrence of the receiving errors, even when the EOD 19 indicating the completion of communication data of the transmitting frame is detected because, even when a plurality of receiving units reply the IFR 20 simultaneously, they collide with each other on the common data line 1. Thus the replies are meaningless for the transmitting units which attempt to acknowledge receipt.

In the conventional communication system by the CSMA/CD method, the multiple address communication takes place as mentioned above, so that the transmitting unit could not find out the occurrence of errors on the receiving unit side (i.e. detected by units in the receiving mode) within one message frame.

Also, as another problem, it was difficult to retrieve respective source addresses of a number of units connected to the common data line from one specific unit. This results in inconvenience when the unit is added and connected newly to the common data line.

SUMMARY OF THE INVENTION

The present invention has been devised to solve such problems as described above, therefore, it is an object thereof to provide a communication control apparatus capable of finding occurrence of errors at a unit on the receiving side (i.e. in a receiving mode) by a unit on the transmitting side (i.e., in a transmitting mode) by one frame communication, improving accuracy of multiple address communication and easily retrieving the source address of the unit having an unspecific source address in one specific unit.

The communication control apparatus according to the present invention is constituted such that, when functioning as a receiving side (i.e., in a receiving mode), a reply data row (acknowledgement) is replied (i.e., sent) only when receiving normally or only when not receiving normally.

The communication control apparatus according to the present invention is also constituted such that, even at the time of multiple address communication, when functioning as the receiving side (i.e., in a receiving mode), the reply data row (acknowledgment) is replied (i.e., sent) only when receiving normally, or only when not receiving normally.

Furthermore, the communication control apparatus of the present invention is constituted such that, at the time of multiple address communication, the reply data row is sent only when a predetermined code sent from the transmitting side is larger than respective source addresses, or only when smaller.

In the communication control apparatus of the present invention, since the reply data row is replied on the receiving side when receiving normally or not receiving normally, on the transmitting side, it is possible to find whether or not the receiving side has received normally within one frame.

Also, in the communication control apparatus of the present invention, at the time of multiple address communication, arranging the system so that all of the communication terminals receiving normally reply with the reply data row (acknowledgment), it is possible to find within one frame that, at least, one communication terminal has received normally when the reply data row is detected on the transmitting side, and when the reply data row is not detected, it is possible to find that all the communication terminals could not receive normally.

Conversely, at the time of multiple address communication, by arranging the system so that all the communication terminals which could not receive normally reply with the reply data row, it is possible to find that, at least, one communication terminal could not receive normally within one frame, when the reply data row is detected on the transmitting side, and when the reply data row is not detected, it is possible to find that all the communication terminals could receive normally.

Furthermore, in the communication control apparatus of the present invention, since it arranged that, only the communication terminal having the source address larger than a code sent from the transmitting side replies the source address as the reply data row, the number of communication terminals connected to the common data line and the source addresses of the respective communication terminals can be retrieved.

Still furthermore, in the communication control apparatus of the present invention, since it is constituted such that, only the communication terminal having the source address smaller than the code sent from the transmitting side replies the source address as the reply data row, the number of communication terminals connected to the common data line and the source addresses of the respective communication terminals can be retrieved.

The above and further objects and features of the invention will more fully be apparent from the following detailed description with accompanying drawings.

BRIEF DESCRIPTION OF THE DRAWINGS

FIG. 13(a) is a wave-form diagram of an IFR on a common data line for explaining an operating state of an IFR control circuit, FIG. 13(b) is a wave-form diagram of an IFR of a B unit for explaining an operating state of an IFR control circuit, FIG. 13(c) is a wave-form diagram of an IFR of C unit for explaining an operating state of an IFR control circuit, FIG. 13(d) is a wave-form diagram of an IFR of a D unit for explaining an operating state of an IFR control circuit, FIG. 14(a) is a timing chart of a frame on a common data line for explaining the operation, when only a unit whose source address is mathematically larger than an IFR control code replies an IFR, FIG. 14(b) is a timing chart of a transmitting frame of an A unit for explaining the operation, when only a unit whose source address is mathematically larger than an IFR control code replies an IFR, FIG. 14(c) is a timing chart of a reply IFR of a B unit for explaining the operation, when only a unit whose source address is mathematically larger than an IFR control code replies an IFR, FIG. 14(d) is a timing chart of a reply IFR of a C unit for explaining the operation, when only a unit whose source address is mathematically larger than an IFR control code replies an IFR, FIG. 14(e) is a timing chart of a replay IFR of a D unit for explaining the operation, when only a unit whose source address is mathematically larger than an IFR control code replies an IFR, FIG. 15(a) is a wave-form diagram of an IFR on a common data line for explaining the operation, when only a unit whose source address is mathematically larger than an IFR control code replies an IFR, FIG. 15(b) is a wave-form diagram of an IFR of a B unit for explaining the operation, when only a unit whose source address is mathematically larger than an IFR control code replies an IFR, FIG. 15(c) is a wave form diagram of an IFR of a C unit for explaining the operation, when only a unit whose source address is mathematically larger than an IFR control code replies an IFR, FIG. 15(d) is a wave-form diagram of an IFR of a D unit for explaining the operation, when only a unit whose source address is mathematically larger than an IFR control code replies an IFR, FIG. 16 is a schematic view for explaining procedures for retrieving source address of communication terminals connected to unspecific common data lines, by a multiple address communication using an IFR control code, FIG. 17(a) is a timing chart of a frame on a common data line showing procedures for retrieving respective source addresses and the number of communication terminals connected to the common data line, FIG. 17(b) is a timing chart of a transmitting frame of an A unit showing procedures for retrieving respective source addresses and the number of communication terminals connected to a common data line, FIG. 17(c) is a timing chart of a reply IFR of a B unit showing procedures for retrieving respective source addresses and the number of communication terminals connected to a common data line, FIG. 17(d) is a timing chart of a reply IFR of a C unit showing procedures for retrieving respective source addresses and the number of communication terminals connected to a common data line, FIG. 17(e) is a timing chart of a reply IFR of a D unit showing procedures for retrieving respective source addresses and the number of communication terminals connected to a common data line, FIG. 18(a) is a timing chart of a frame on a common data line showing procedures for retrieving respective source addresses and the number of communication terminals connected to the common data line, FIG. 18(b) is a timing chart of a transmitting frame of an A unit showing procedures for retrieving respective source addresses and the number of communication terminals connected to a common data line, FIG. 18(c) is a timing chart of a reply IFR of B unit showing procedures for retrieving respective source addresses and the number of communication terminals connected to a common data line, FIG. 18(d) is a timing chart of a reply IFR of a C unit showing procedures for retrieving respective source addresses and the number of communication terminals connected to a common data line, FIG. 18(e) is a timing chart of a reply IFR of a D unit showing procedures for retrieving respective source addresses and the number of communication terminals connected to a common data line, FIG. 19(a) is a timing chart of a frame on a common data line showing procedures for retrieving respective source addresses and the number of communication terminals connected to a common data line, FIG. 19(b) is a timing chart of a transmitting frame of an A unit showing procedures for retrieving respective source addresses and the number of communication terminals connected to a common data line, FIG. 19(c) is a timing chart of a reply IFR of a B unit showing procedures for retrieving respective source addresses and the number of communication terminals connected to a common data line, FIG. 19(d) is a timing chart of a reply IFR of a C unit showing procedures for retrieving respective source addresses and the number of communication terminals connected to a common data line, FIG. 19(e) is a timing chart of a reply IFR of a D unit showing procedures for retrieving respective source addresses ad the number of communication terminals connected to a common data line, FIG. 20(a) is timing chart of a frame on a common data line showing procedures for retrieving respective source addresses and the number of communication terminals connected to a common data line, FIG. 20(b) is a timing chart of a transmitting frame of an A unit showing procedures for retrieving respective source addresses and the number of communication terminals connected to a common data line, FIG. 20(c) is a timing chart of reply IFR of a B unit showing procedures for retrieving respective source addresses and the number of communication terminals connected to a common data line, FIG. 20(d) is a timing chart of a reply IFR of a C unit showing procedures for retrieving respective source addresses and the number of communication terminals connected to a common data line, and FIG. 20(e) is a timing chart of a reply IFR of a D unit showing procedures for retrieving respective source addresses and the number of communication terminals connected to a common data line.

DESCRIPTION OF THE PREFERRED EMBODIMENTS

In the following, the present invention is particularly described on the basis of the drawings showing its embodiments.

Figure 7:
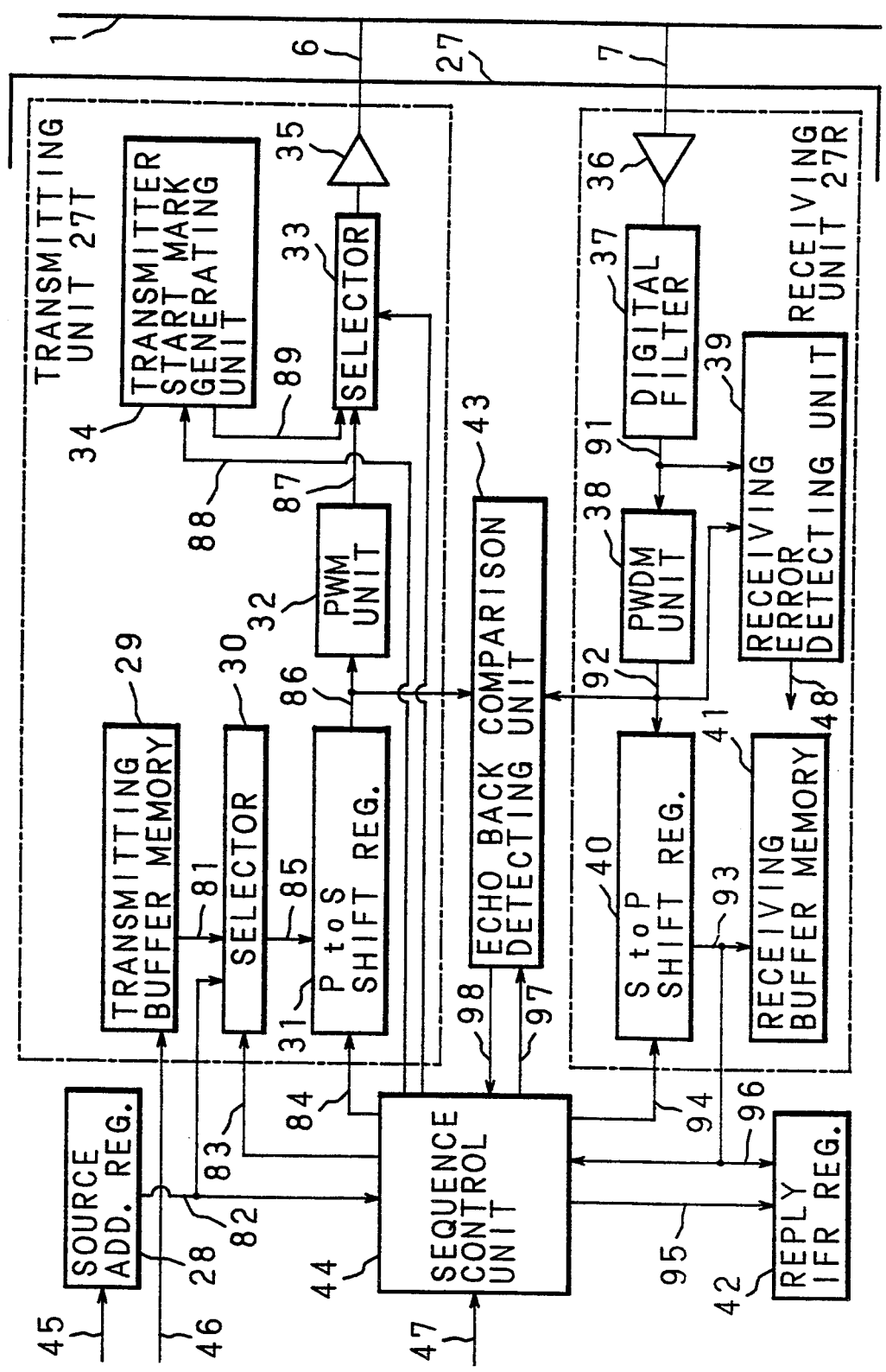
FIG. 7 is a block diagram showing an example of configuration of transmitting and receiving units of a communication control apparatus of the present invention.

FIG. 7 is a block diagram showing an example of configuration of transmitting and receiving units of a communication control apparatus of the present invention.

The communication control apparatus of the present invention is designated by reference numeral 27, and is constituted by a transmitting unit 27T, a receiving unit 27R, source address registers 28, a sequence control unit 44, a reply IFR register 42, an echo back comparison detecting unit 43 and so on. The transmitting unit 27T is connected to a common data line 1 through a transmitting line 6, and the receiving unit 27R is connected to the same through a receiving line 7.

Though not shown in FIG. 7, a microcomputer is connected to the communication control apparatus 27 of the present invention at the left side in FIG. 7.

To the source address registers 28, source addresses allocated to the communication control apparatus 27 are inputted from the external microcomputer via a signal line 45. The sequence control unit 44 is controlled by a control signal given from the microcomputer via a signal line 47.

The echo back comparison detecting unit 43 compares the echo backs as to be described later. The replay IFR register 42 stores a reply IFR given from the receiving unit 27R.

The transmitting unit 27T is constituted by a transmitting buffer memory 29, a selector 30, a P to S (Parallel to Serial) shift register 31, a PWM (Pulse Width Modulation) unit 32, a selector 33, a transmit start mark generating unit 34, a transmitting buffer 35 and so on.

The transmitting buffer memory 29 stores temporarily a data row to be sent which is given from the external microcomputer via a signal line 46. The data row stored in the transmitting buffer memory 29 is given to the selector 30 as parallel data via a signal line 81. The source address stored in the source address register 28 is also given to the selector 30 via a signal line 82, and either of the source address or the data row is selected by the control signal given from the sequence control unit 44 via signal lines 83, 84, and inputted to the P to S shift register 31.

The P to S shift register 31 converts the parallel data inputted from the aforesaid selector 30 via signal line 85 into serial data, which is outputted to the PWM unit 32 and the echo back comparison detecting unit 43 via a signal line 86. The PWM unit 32 outputs the serial data outputted from the P to S shift register 31 to the selector 33 via a signal line 87 after the pulse width modulation.

The transmit start mark generating unit 34 generates a transmit start mark according to a control signal given from the sequence control unit 44 via a signal line 88, and outputs it to the aforesaid selector 33 via a signal line 89. The selector 33 selects either a bit pattern after PWM modulated to be outputted to the signal line 87 from the PWM unit 32, or the transmit start mark to be outputted from the transmit start mark generating unit 34 to the signal line 89, and outputs it to the transmitting line 6 via the output buffer 35.

The receiving unit 27R is constituted by a receiving buffer 36, a digital filter 37, a PWDM (Pulse Width Demodulation) unit 38, a receiving error detecting unit 39, an S to P (Serial to Parallel) shift register 40, a receiving buffer memory 41 and so on.

The receiving buffer 36 inputs a signal from the common data line 1 via the receiving line 7 and gives it to the digital filter 37. The digital filter 37 removes noise components from the inputted signal, and gives it to the PWDM unit 38 and the receiving error detecting unit 39 via a signal line 91. The PWDM Unit 38 gives the signal given from the digital filter 37 to the echo back comparison detecting unit 43, S to P shift register 40 and receiving error detecting unit 39 via a signal line 92 after pulse width demodulated.

The S to P shift register 40 converts serial data into parallel data to write data outputted from the PWDM unit 38 into the receiving buffer memory 41 via a signal line 93.

To the S to P shift register 40, a control signal which operates the S to P shift register 40, is inputted from the sequence control unit 44 via a signal line 94 when destination address data in the receiving frame and source address data stored in the source address register 28 are coincided after being compared, or when data signifying the multiple address communication and the destination address data are coincided after being compared.

To the reply IFR register 42 storing the replied IFS, a control signal showing a section, wherein the reply IFR is to be stored, is given from the sequence control unit 44 via a signal line 95, and a data output line 96 is connected from the S to P shift register 40.

To the echo back comparison detecting unit 43, an output of the PWDM unit 38 and an output of the P to S shift register 31 are connected, and moreover, a comparison timing control signal is given from the sequence control unit 44 via a signal lie 97. Output of the comparison results by the echo back comparison detecting unit 43 is inputted to the sequence control unit 44 via signal line 98. When the comparison results are different, or when the echo back comparison detecting unit 43 detects a collision, the sequence control unit 44 outputs the control signal stopping its operation to the P to S shift register 31 via the signal line 84 and stops transmission of the transmitting frame.

Next, the operation, at the time of multiple address communication by the communication control apparatus of the present invention constructed as mentioned heretofore is described with reference to a timing chart of FIG. 8 and a wave-form diagram of FIG. 9. The communication control apparatus 27 of the present invention shown in FIG. 7 corresponds respectively to the units 2, 3, 4 and 5 shown in FIG. 1.

Figure 1:
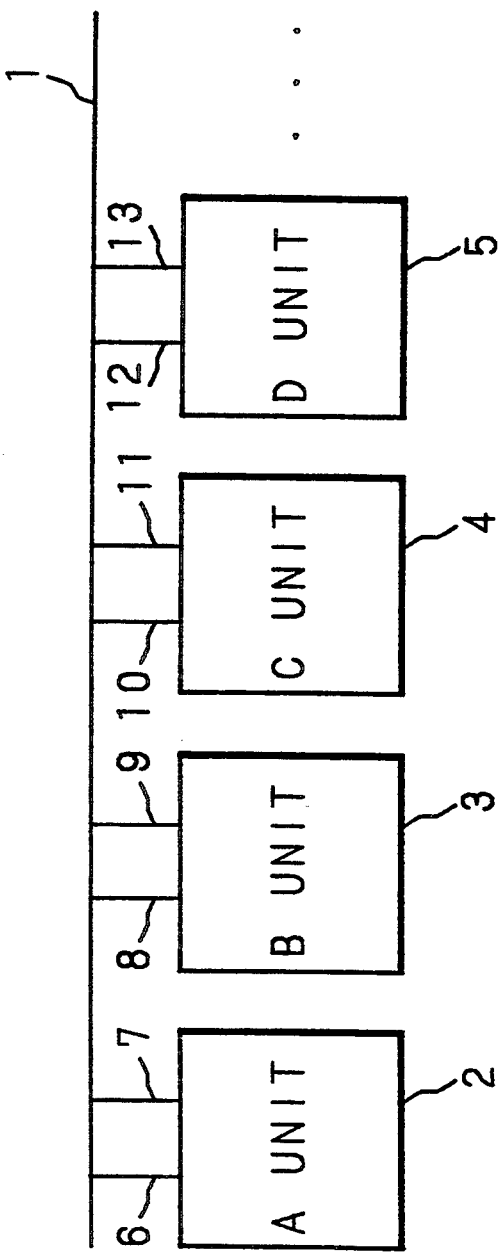
FIG. 1 is a schematic view showing an example of connection between a conventional communication control apparatus having a bus contention control function by a CSMA/CD accessing method, and a common data line.
Figure 2:
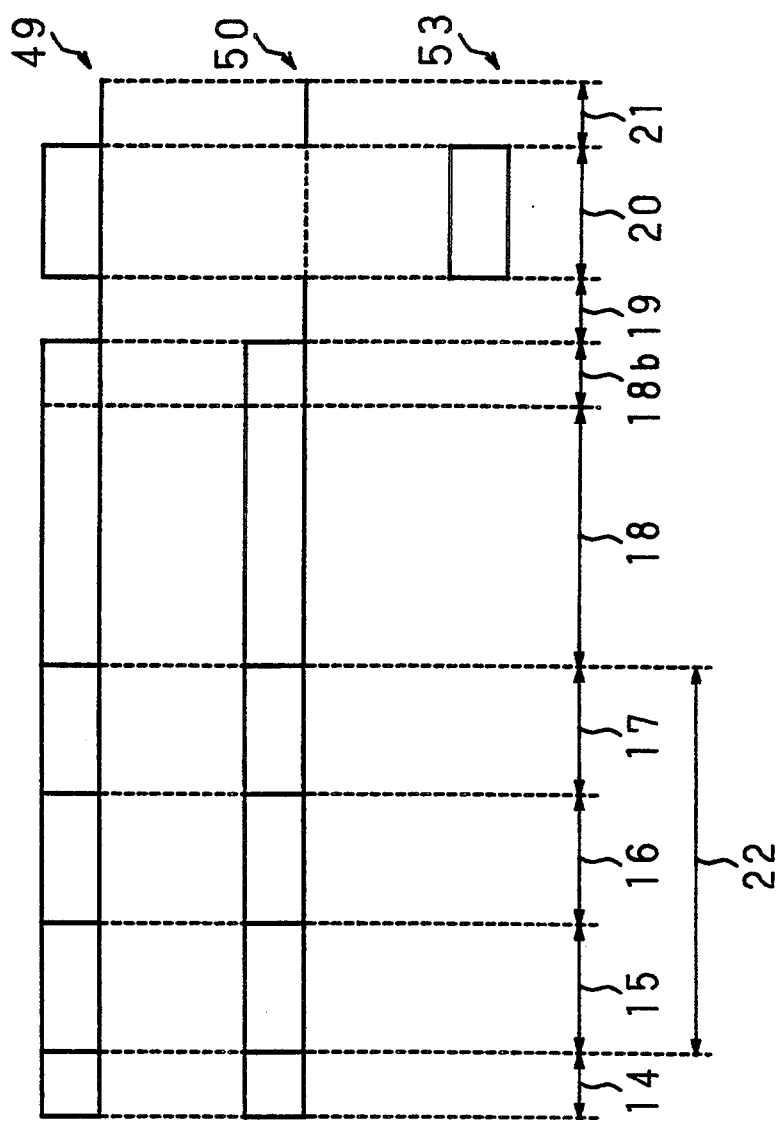
FIG. 2 is a schematic view showing an example of a communication format used in a conventional communication system.
Figure 3:
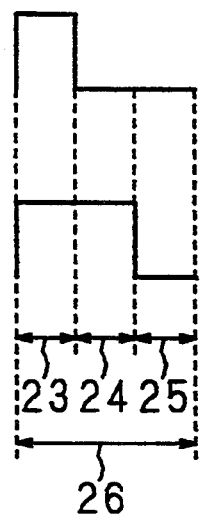
FIG. 3(a) is a wave-form diagram showing a pulse width modulated bit format of a signal representing a bit "1" constituting a communication format.
FIG. 3(b) is a wave-form diagram showing a pulse width modulated bit format of a signal representing a bit "0" constituting a communication format.
Figure 4:
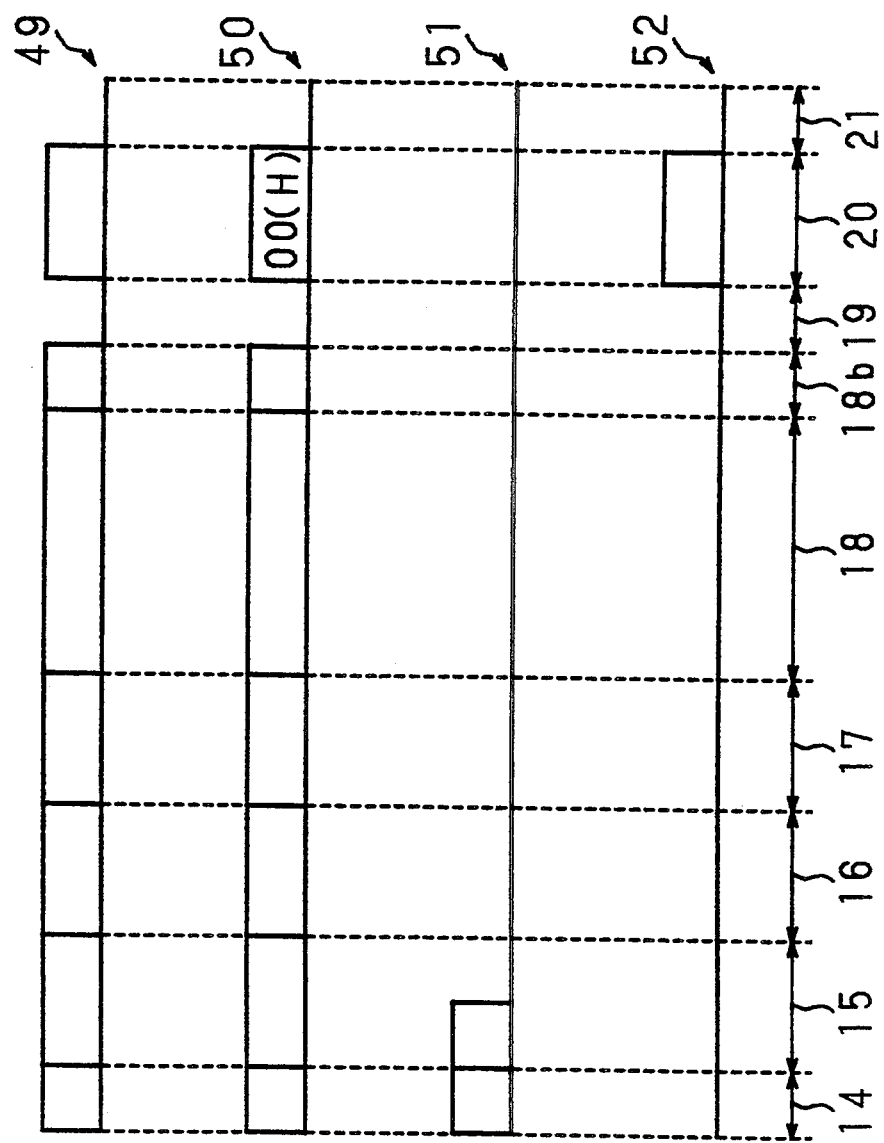
FIG. 4(a) is a timing chart of a frame on a common data line for explaining the operation of a bus contention control.
FIG. 4(b) is a timing chart of a transmitting frame of an A unit for explaining the operation of a bus contention control.
FIG. 4(c) is a timing chart of a transmitting frame of a B unit for explaining the operation of a bus contention control.
FIG. 4(d) is a timing chart of a transmitting frame of a C unit for explaining the operation of a bus contention control.
Figure 5:
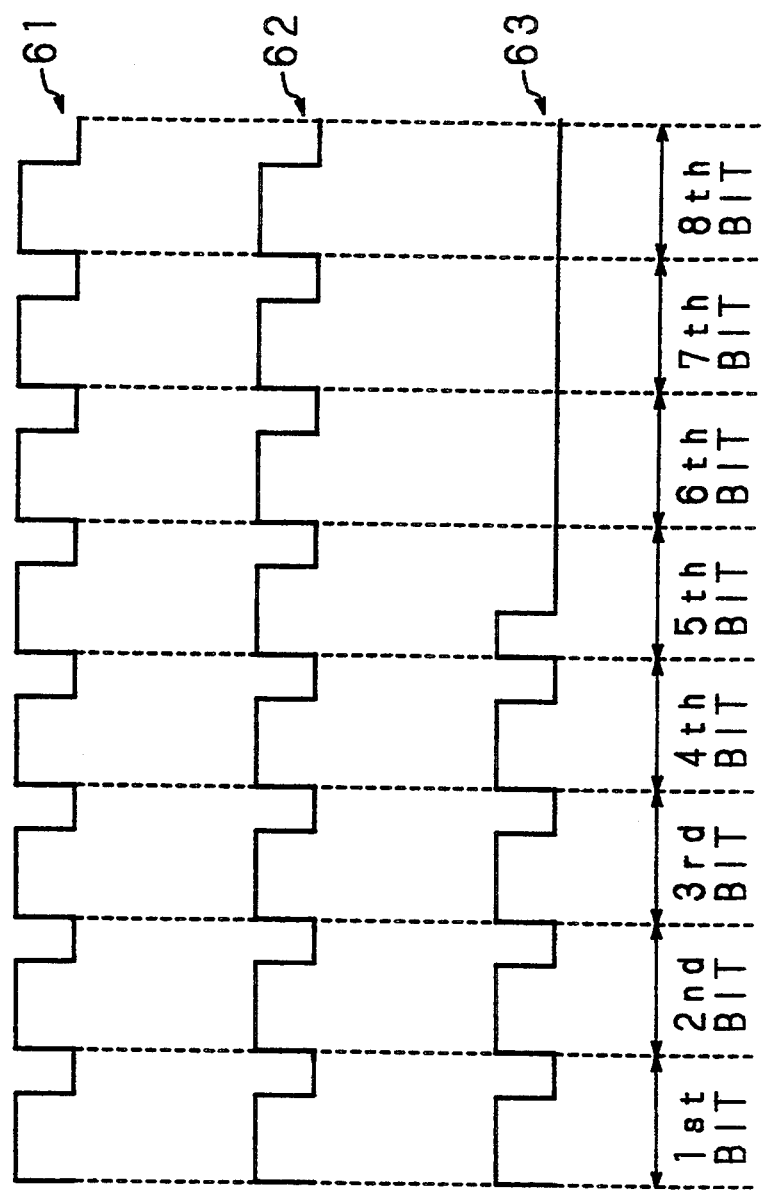
FIG. 5(a) is a wave-form diagram of a primary code on a common data line for explaining the operation of a bus contention control.
FIG. 5(b) is a wave-form diagram of a priority code sent by an A unit for explaining the operation of a bus contention control.
FIG. 5(c) is a wave-form diagram of a priority code sent by a B unit for explaining the operation of a bus contention control.
Figure 6:
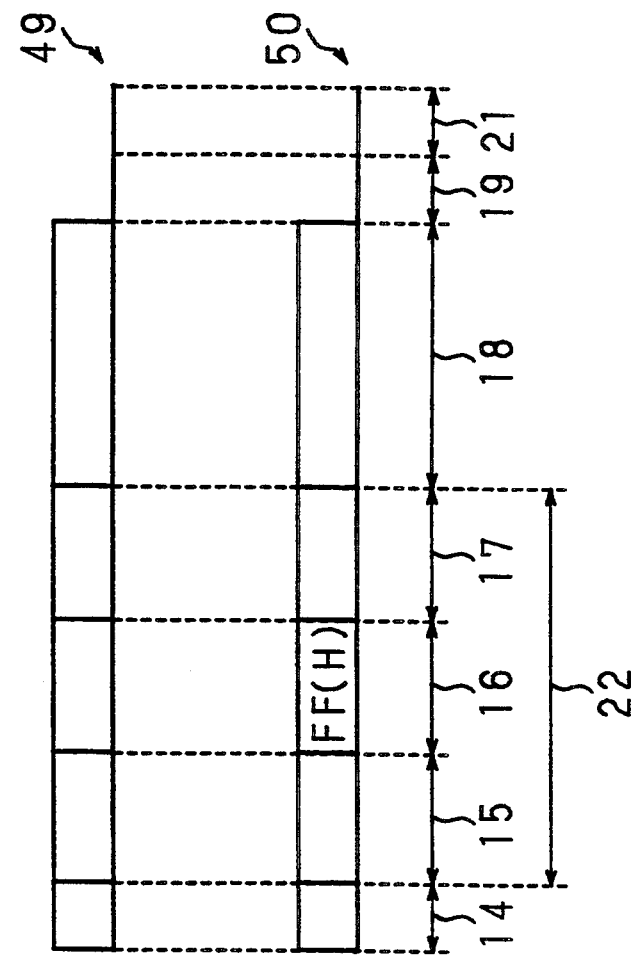
FIG. 6(a) is a timing chart of a frame on a common data line of a communication example for explaining a multiple address communication.
FIG. 6(b) is a timing chart of a transmitting frame of an A unit of a communication example for explaining a multiple address communication.

Now, for example, when the A unit 2 shown in FIG. 1 transfers data simultaneously to the other units connected to the common data line 1, that is, to the B unit 3, C unit 4 and D unit 5, a multiple address communication code predetermined in the communication system is outputted as the destination address 16. Hereupon, the following description is made on the condition that the multiple address communication code is "FF(H)".

As shown in FIG. 8(b), the A unit 2 sends out a transmitting frame 50 to the common data line 1.

In the other B unit 3, C unit 4 and D unit 5 connected to the common data line 1, the sequence control unit 44 respectively detects that the destination address 16 in the transmitting frame 50 sent to the common data line 1 from the A unit 2 is the "FF(H)" to start the P to S shift register 40 to operate, and moves to the receiving processing.

The units 3, 4 and 5, after detecting the EOD 19 in the transmitting frame 50, when the receiving error detecting unit 29 does not detect the errors, respectively reply the source addresses as the IFR 20. Hereupon, the source addresses of the B unit 3, C unit 4 and D unit 5 are respectively set to "07(H)", "3F(H)" and "0F(H)" in order as shown in FIGS. 8(c), (d) and (e).

In the units 3, 4 and 5, a control signal showing an IFR reply section is inputted to the selector 30 from the sequence control unit 44. Thereby, to each P to S shift registers 31, the contents of the source address register 28 are inputted. And, by giving the control signal for performing echo back comparison in the IFR reply section to the echo back comparison detecting unit 43 from the sequence control unit 44, the echo back comparison for the IFR 20 sent by each of the units 3, 4 and 5 itself is performed in each of the units 3, 4 and 5.

As respectively shown in FIGS. 8(c), (d) and (e), the IFR 20 replied from the units 3, 4 and 5 is subjected to the echo back comparison with the IFR 20 of the frame 49 on the common data line 1 in the respective echo back comparison detecting units 43. As the result, in the units 3, 4 and 5, it is detected that wave forms of the IFR 20 respectively outputted do not appear on the IFR 20 of the frame 49 on the common data line 1 shown in FIG. 8(a), by comparing the wave form inputted from the receiving line 9 and the wave form outputted by each of the units 3, 4 and 5 itself in the echo back comparison detecting unit 43, and stops to send the IFR 20 thereafter.

Figure 8:
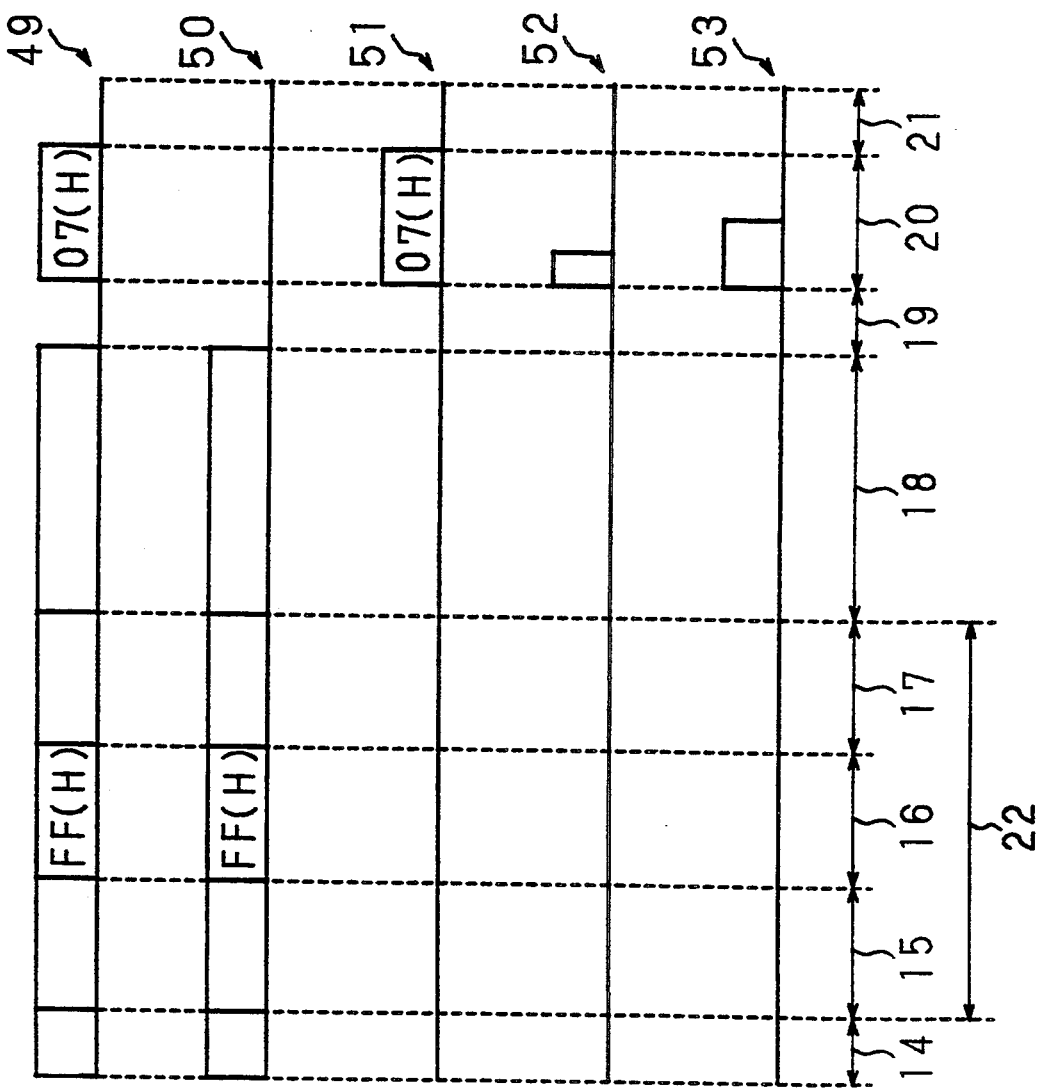
FIG. 8(a) is a timing chart of a frame on a common data line for explaining the operation at the time of multiple address communication by a communication control apparatus of the present invention.
FIG. 8(b) is a timing chart of a transmitting frame of an A unit For explaining the operation at the time of multiple address communication by a communication control apparatus of the present invention.
FIG. 8(c) is a timing chart of a replay IFR of a B unit for explaining the operation at the time of multiple address communication by a communication control apparatus of the present invention.
FIG. 8(d) is a timing chart of a reply IFR of a C unit for explaining the operation at the time of multiple address communication by a communication control apparatus of the present invention.
FIG. 8(e) is a timing chart of a reply IFR of a D unit for explaining the operation at the time of multiple address communication by a communication control apparatus of the present invention.

Thus, in the example shown in FIG. 8, only the IFR 20 outputted from the B unit 3, to which "07(H)" is allocated as the source address, as the reply IFR 51, is replied to the A unit 2.

Figure 9:
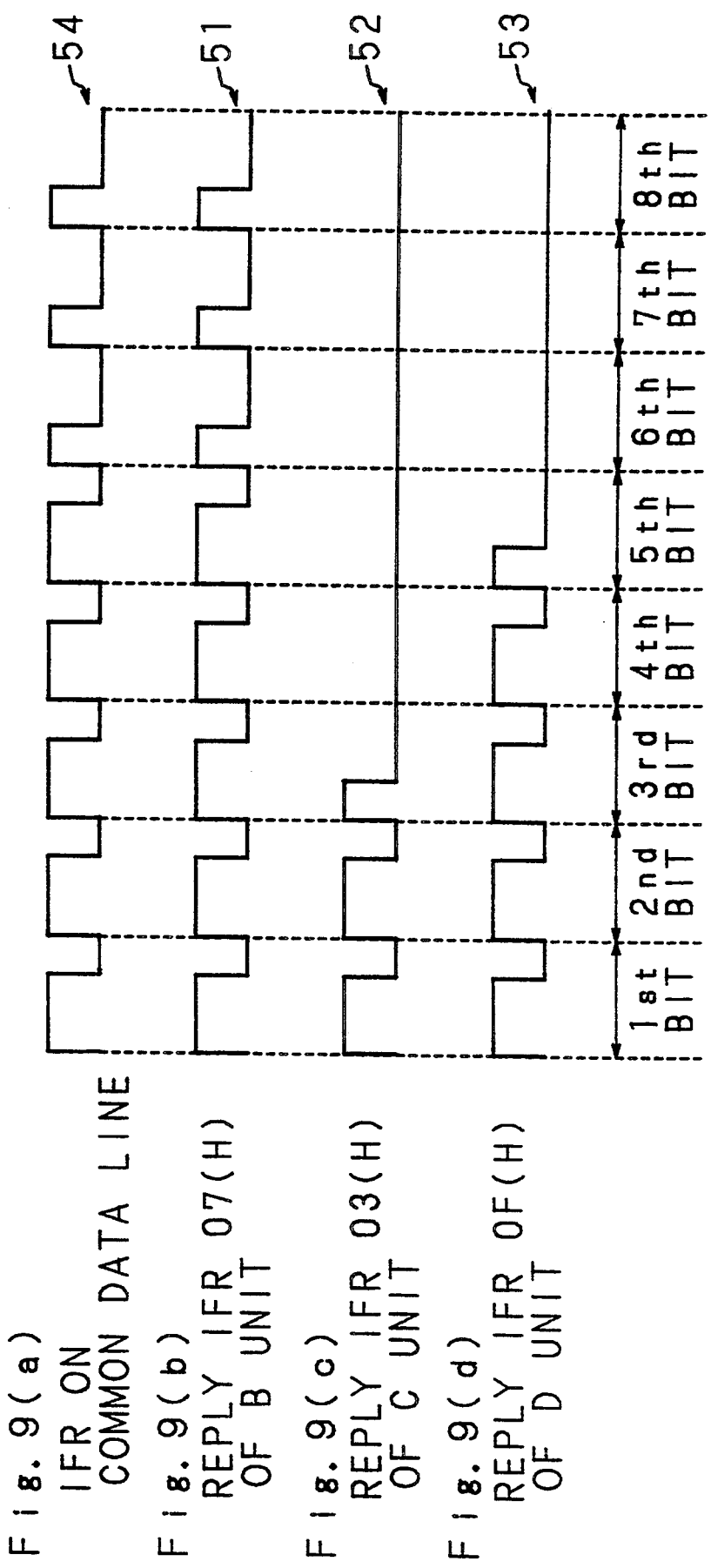
FIG. 9(a) is a wave-form diagram of an IFR on a common data line for explaining the operation at the time of multiple address communication by a communication control apparatus of the present invention.
FIG. 9(b) is a wave-form diagram of a reply IFR of a B unit for explaining the operation at the time of multiple address communication by a communication control apparatus of the present invention.
FIG. 9(c) is a wave-form diagram of a replay IFR of a C unit for explaining the operation at the time of multiple address communication by a communication control apparatus of the present invention.
FIG. 9(d) is a wave-form diagram of a reply IFR of a D unit for explaining the operation at the time of multiple address communication by a communication control apparatus of the present invention.

Further description is made with reference to the detailed drawing of FIG. 9.

As aforementioned, though "07(H)", "3F(H)", "0F(H)" are allocated to the B unit 3, C unit 4 and D unit 5 in order the source addresses, they are respectively "00000111", "00111111" and "00001111" in order in a binary code. Thus, the C unit 4 among the B, C, D units 3, 4, 5 which start replying the IFR 20 at the same time, as shown in FIG. 9(c), detects that a bit wave form 52 of the IFR 20 sent by itself differs from a bit wave form 54 shown in FIG. 9(a) inputted from the common data line 1 via the receiving buffer 36 at a third bit, and stops to reply the IFR 20. Also, as shown in FIG. 9(d), the D unit 5 detects that, a bit wave form 53 of the IFR 20 sent by itself differs from the bit wave form 54 shown in FIG. 9(a) inputted from the common data line 1 via the receiving buffer 36 at a fifth bit, and similarly stops to reply the IFR 20. And, as shown in FIG. 9(b), only the IFR 20 of "07(H)" replied by the B unit 3 is replied to the A unit 2 which is the transmitting unit.

By the operation as mentioned above, the A unit 2 can detect within a period of one frame, that, at least, the B unit 3 among the B, C, D units 3, 4 and 5 connected to the common data line 1, has received normally the transmitting frame sent from the A unit 2.

Though the case, where only the unit which has received normally at the time of multiple address communication relied the IFR 20 is explained, it is also preferable that only the unit in which a receiving error has occurred replies the IFR 20.

In such a case, it is possible that the A unit 2 can find out that all the other receiving units 3, 4 and 5 except itself, which are connected to the common data line 1, have received normally, when the IFR is not replied at all. In the case when the IFR 20 is replied, the A unit 20 can find out that the receiving error occurs, at least, in the receiving unit which has replied the IFR unit 20.

Next, a second invention is described.

In the second invention, by using an IFR control code in a communication format, only the unit whose source address is mathematically smaller than the IFR control code, replies the IFR at the time of multiple address communication.

In the following, one embodiment of the second invention is described with reference to FIG. 10 to FIG. 13.

Figure 10:
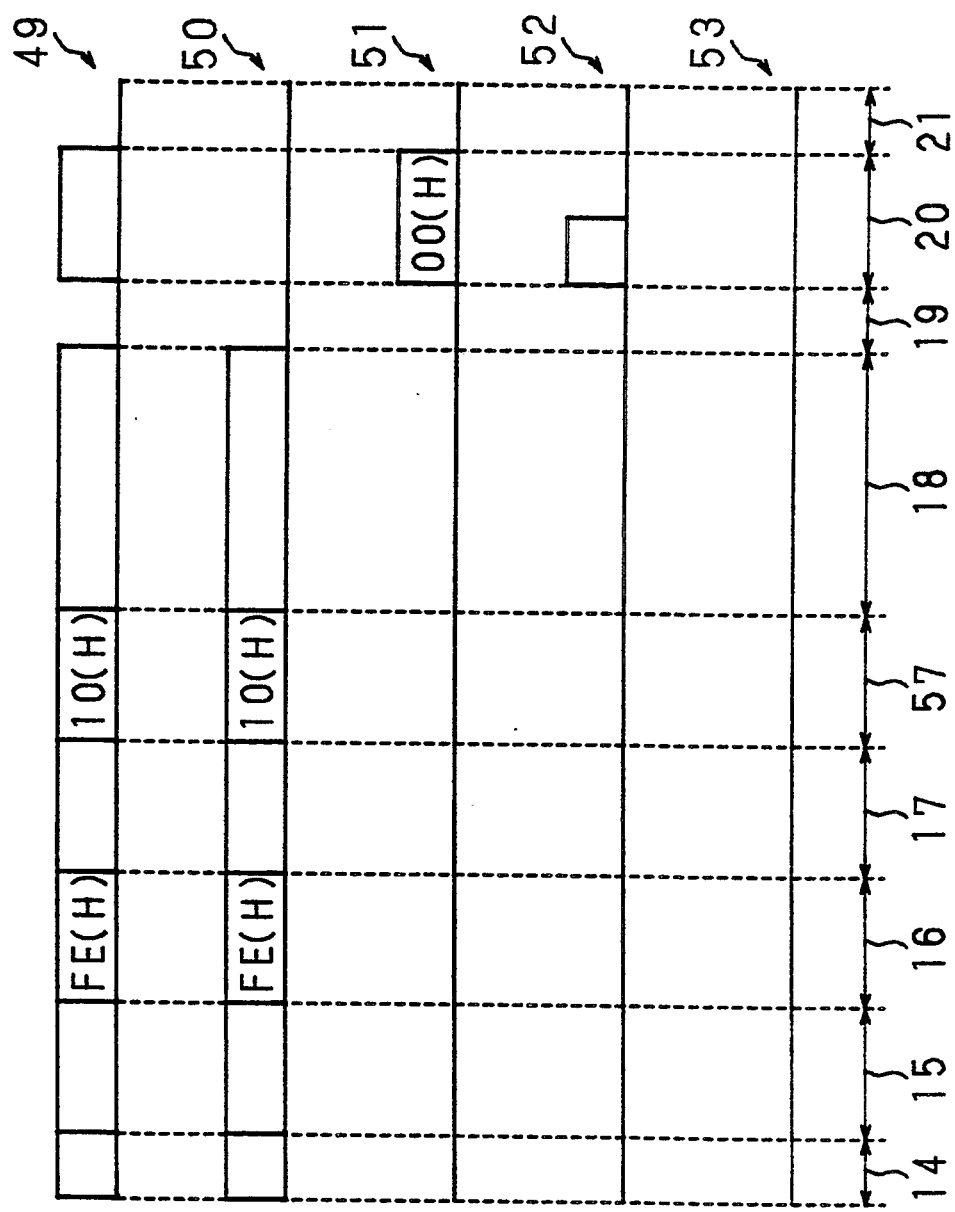
FIG. 10(a) is a timing chart of a frame on a common data line showing a communication frame state by a second invention.
FIG. 10(b) is a timing chart of a transmitting frame of an A unit showing a communication frame state by a second invention.
FIG. 10(c) is a timing chart of a replay IFR of a B unit showing a communication frame state by a second invention.
FIG. 10(d) is a timing chart of a reply IFR of a C unit showing a communication frame state by a second invention.
FIG. 10(e) is a timing chart of a reply IFR of a D unit showing a communication frame state by a second invention.

FIG. 10 is a timing chart showing a state of communication frame according to the second invention.

As shown in FIG. 10(b), the A unit 2 sends out the transmitting frame 50 to the common data line 1. In the second invention, on the frames sent to the common data line 1 from the units 2, 3, 4 and 5, an IFR control code 57 is set between the source address 17 and a communication data area 18.

In this embodiment, the A unit 2 is to output "10(H)" as the IFR control code 57.

In the B unit 3, C unit 4 and D unit 5 connected to the common data line 1, since it is respectively detected by the sequence control unit 44 that, the destination address the frame 50 sent on the common data line 1 from the A unit 2 is a multiple address communication code "FE(H)" signifying the multiple address communication, respective P to S shift registers 40 start to operate and move to the receiving processing. Thereby, the IFR control code 57 in the frame on the common data line 1 is inputted from the common data line 1 via the receiving buffer 36, and data of the IFR control code 57 are stored in the reply IFR register 42.

Figure 11:
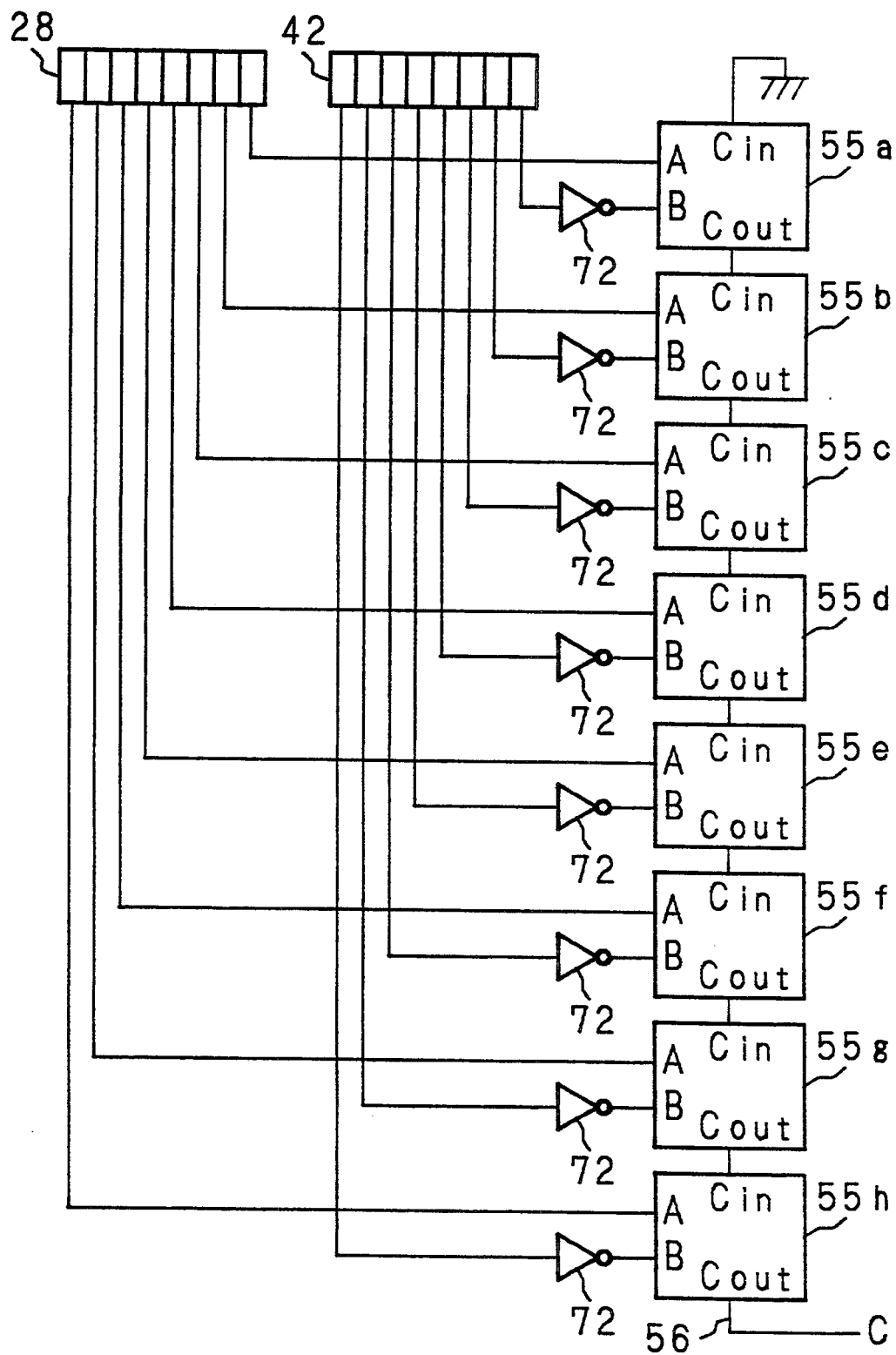
FIG. 11 is a circuit diagram showing an example of configuration of an IFR control circuit, of a communication control apparatus of the present invention.

FIG. 11 is a circuit diagram showing an example of configuration of a circuit for comparing the IFR control code 57 stored in the aforesaid reply IFR register 42 and the source address stored in the source address register 28, or an IFR control circuit. In addition, the IFR control circuit is provided inside of the sequence control unit 14.

Figure 12:
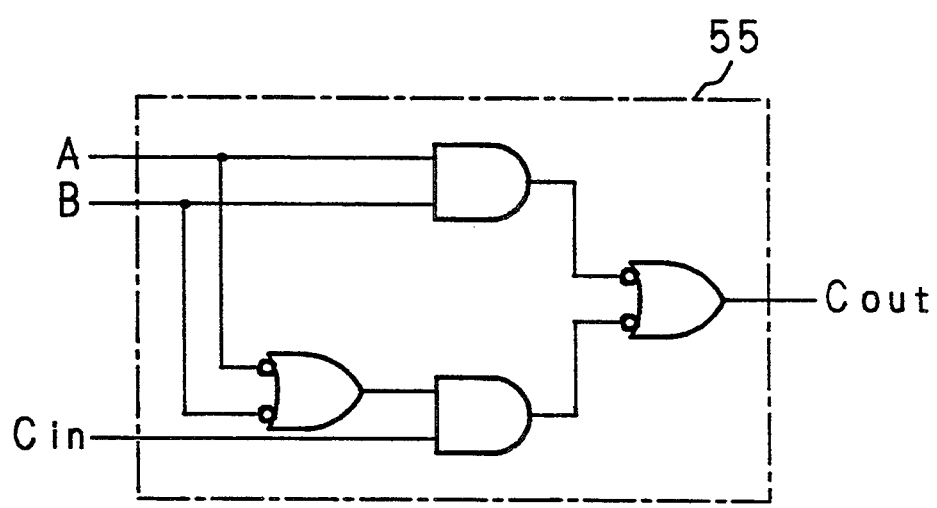
FIG. 12 is a circuit diagram showing an example of logic circuit of an IFR control circuit of a communication control apparatus of the present invention.

In FIG. 11, reference numerals 55a to 55h designate logic circuits having the same configuration and constituted by the logic circuit having the circuit configuration designated by reference numeral 55 in FIG. 12.

Respective bits of the output signal of the source address register 28 of 8-bit configuration are inputted to input terminals A of the logic circuits 55a to 55h, and similarly, respective bits of the output signal of the reply IFR register 42 of 8-bit configuration are respectively inputted to input terminals B of the logic circuits 55a to 55h via inverters 72. Output terminals Cout of the logic circuits 55a to 55h are respectively connected to input terminals Cin of the logic circuits 55b to 55h in the next stage, and only the input terminal Cin of the logic circuit 55a in the first stage is fixed at "L" level. AC output 56 from the output terminal Cout of the logic circuit 55h in the last stage turns into the "L" level when $VA \leq VB$, and turn into "H" level when $VA > VB$ when it is assumed that a value held by the source address register 28 is VA and a value held by the reply IFR register 42 is VB.

Now, the operation of the IFR control circuit is described on the B unit 3, assuming that the source addresses of the units on the receiving side are respectively set to "00(H)" for the B unit 3, to "0F(H)" for the C unit 4 and to "F0(H)" for the D unit 5 as shown in FIG. 13.

In the source address register 28 of the B unit 3, data "00(H)" is stored, and in the reply register 42, data "10(H)" outputted from the A unit 2 as the IFR control code 57 is stored. In this case, the A unit 2 as the IFR control code 57 is stored. In this case, since the data "00(H)" stored in the source address register 28 is smaller than the data "10(H)" stored in the IFR control code register 42 in the B unit 3, the C output 56 of the IFR control circuit of the B unit 3 becomes "L" level.

Also, since data "F0(H)" stored in the source address register 28 is larger than the data "10(H)" stored in the IFR control code register 42, the C output 56 of its IFR control circuit becomes "H" level.

In such a manner, the units 3, 4 and 5 on the receiving side compare respective source address data with data of the IFR control code 57 outputted from the A unit 2 to judge mathematical differences. After detecting EOD indicating the completion of the frame, the receiving side units 3, 4 and 5 reply the IFR 20.

Hereupon, the unit shown in FIG. 11 whose C output 56 of the IFR control circuit is at "H" level, that is, the D unit outputs the control signal from the sequence control unit 44 and stops the operation of the P to S shift register 31, thereby, does not reply the IFR 20 as shown in FIG. 13(d). And, as shown in FIGS. 13(b) and (c), the IFR 20 of the B unit 3 and C unit 4 having the source addresses smaller than the value "10(H)" of the IFR control code 57 outputted from the A unit 2 are replied, and the C unit 4 detects that a wave form 52 of the IFR 20 sent by itself and the wave form 54 outputted on the common data line 1 differ at a fifth bit., and stops to reply the IFR 20. Thereby, as shown in FIG. 7(c) and FIG. 13(b), the IFR 20 of the B unit 3 is replied to the A unit 2 on the transmitting side.

Next, referring to a timing chart of FIG. 14 and a wave form diagram of FIG. 15, an embodiment wherein only the unit whose source address is mathematically larger than the IFR control code replies the IFR 20 is described.

The IFR control circuit shown in FIG. 11 operates similarly as above-mentioned case, and only in the D unit 5 whose source address is set to "F0(H)", the C output 56 of the IFR control circuit becomes "H" level. Hereupon, since it is so set that only the unit which becomes "H" level replies the IFR to the sequence control unit 44, as shown in FIG. 14(e) and FIG. 15(d), only the D unit 5 replies the IFR 20, and the B unit 3 and C unit 4 each of whose C output 56 of the IFR control circuit has become "L" level do not reply the IFR 20 as shown in FIGS. 14(c), (d) and FIGS. 15(b), (c). That is, the IFR 20 of the D unit 5 is replied to the A unit 2 on the transmitting side as shown in FIG. 14(a) and FIG. 15(a).

Next, procedures for retrieving the source address of an unspecific unit connected to the common data line 1 by a multiple address communication using the above-mentioned IFR control code is described.

Now, for example, as shown in FIG. 16, it is assumed that four units from the A unit 2 to D unit, 5 are connected to the common data line 1.

Hereupon, as the source addresses of the units 2, 3, 4 and 5, it is assumed that. "11(H)" is allocated to the A unit 2, "05(H)" to the B unit 3, "15(H)" to the C unit 4 and "5A(H)" to the D unit 5.

In this communication system, it is also assumed that it denotes a usual multiple address communication, when "FF(H)" is set as the destination address 16 and the transmitting frame is sent to the common data line 1. In this case, all of the units 2, 3, 4 and 5 connected to the common data line 1 reply the IFR 20 after the multiple address receiving processing in the same way as mentioned before.

While, when "FE(H)" is set as the destination address 16 and the transmitting frame is sent, it denotes the multiple address communication by the IFR control code 57. In this case, all of the units 2, 3, 4 and 5 connected to the common data line 1 conduct the receiving processing, and only the unit whose source address is set mathematically larger than the IFR control code 57 replies the IFR 20.

Now, procedures for retrieving respective source addresses and the number of other units connected to the common data line 1 by the A unit 2, is described with reference to timing charts of FIG. 17, FIG. 18, FIG. 19 and FIG. 20.

At first, as shown in FIG. 17(b), the A unit 2 sets the destination address 16 to "FF(H)" and sends the transmitting frame 50 to the common data line 1. The B, C and D units 3, 4 and 5 all conduct receiving processing to the transmitting frame 50, and reply the IFR 20 after detecting the EOD 19. As shown in FIGS. 17(d), (e), the C, D units 4, 5 detect a collision in the IFR reply section and stop to reply the IFR 20. While, as shown in FIG. 17(c), the source address "05(H)" of the B unit 3 is replied to the A unit 2 on the transmitting side as the IFR 20. By receiving "05(H)", a value of the IFR 20 in the frame 49 on the common data line 1 shown in FIG. 17(a), it is possible for the A unit 2 to find out that, the mathematically smallest source address among those set in the units connected to the communication system is "05(H)".

Next, as shown in FIG. 18(b), the A unit 2 sets the destination address to "FE(H)" and the IFR control code to "05(H)" of the B unit 3, which is the smallest source address detected previously, and sends the transmitting frame to the common data line 1. The B, C and D units 3, 4 and 5 all conduct receiving processing for the frame sent by the A unit 2. And, the B, C and D units 3, 4 and 5 compare "05(H)", the value of the IFR control code with the source addresses set in itself, and after the C unit 4 anti D unit 5 set to the mathematically larger source addresses detect the EOD respectively, reply the IFR 20 shown in FIGS. 18(d), (e). As shown in FIG. 18(e), the D unit 5 detects a collision in the IFR reply section, and stops to reply the IFR 20. As the result, the source address "15(H)" of the C unit 4 is replied to the A unit 2 on the transmitting side as the IFR 20 as shown in FIG. 18(a). The A unit 2 finds out that, the source address among those set in the units connected to the communication system, which is mathematically smaller than "05(H)", is "15(H)".

Next, as shown in FIG. 19(b), the A unit 2 sets the destination address to "FE(H)" and the IFR control code to "15(H)" of the C unit 4, which is the next smallest source address detected previously, and sends the transmitting frame. The B, C and D units 3, 4 and 5 all conduct receiving processing. The B, C and D units 3, 4 and 5 compare "15(H)", the value of the IFR control code 57 with the source addresses set to itself. As the result, after only the D unit 5 set to the source address, which is mathematically larger than "15(H)", the value of the IFR control code 57 detects the EOD, replies the IFR 20 shown in FIG. 19(e). By receiving "5A(H)", the value of the IFR 20 in the frame 49 on the common data line 1 shown in FIG. 19(a), the A unit 2 finds out that, the next mathematically smaller source address among those set in the units connected to the communication system is "5A(H)".

Next, as shown in FIG. 20(b), the A unit 2 sets the destination address to "FE(H)" and the IFR control code to "5A(H)" of the D unit 5, which is the next smaller source address detected previously, and sends out the transmitting frame. The B, C and D units 3, 4 and 5 all conduct receiving processing. The B, C and D units 3, 4 and 5 compare the value "5A(H)" of the IFR control code 57 and the source addresses set in itself. As the result, since there is no unit to which the source address, which is mathematically larger than "5A(H)", the value of the IFR control code 57 is set, as shown in FIGS. 20(c), (b) and (e), no unit reply the IFR 20 to the A unit 2 on the transmitting side. Thus, the A unit 2 finds out that the unit to which the source address larger than "5A(H)" is set is not connected, by the fact that the IFR 20, does not present in the frame 49 on the common data line 1 shown in FIG. 20(a).

By the procedures described heretofore, it is possible for the A unit 2 to find out that, three units are connected to this communication system besides itself, and their source addresses are respectively, "05(H)", "15(H)" and "5A(H)".

In the above-mentioned embodiment, respective source addresses and the number of units connected to the common data line 1 are retrieved, by replying the IFR 20 by the unit to which the source address which is mathematically larger than the IFR control code 57 is set. However, it is to be understood that the similar effect may be obtained by the configuration, in which the unit to which the source address which is mathematically smaller than the IFR control code 57 is set, replies the IFR 20.

Whether to reply the IFR 20 by the unit to which the source address which is larger than the IFR control code 57 is set, or to reply the IFR 20 by the unit to which the source address which is smaller than the IFR control code 57 is set, may be controlled by data included in the frame sent to the common data line 1 from the unit on the transmitting side.

Furthermore, whether to replay the IFR 20 from the unit wherein the receiving error is produced, or to reply the IFR 20 from the unit wherein the receiving error is not produced, or to send the IFR 20 in any case, may be controlled by data included in the frame.

As particularly described heretofore, according to the communication control apparatus of the present invention, it is possible to find out on the transmitting side whether or not receiving side has received normally, by one frame communication.

Also, according to the communication control apparatus of the present invention, at the time of multiple address communication, when it is constituted such that, the IFR is replied by the unit wherein the receiving error is not produced, it can be found out that, at least, one communication terminal has received normally on the transmitting side, and when the IFR is not replied at all, it can be found out that all of the communication terminals have not received normally.

Furthermore, according to the communication control apparatus of the present invention, at the time off multiple address communication, when it is constituted such that, the IFR is replied by the unit wherein the receiving error is produced, it can be found out that, at least, one communication terminal produces the communication error on the transmitting side, and when the IFR is not replied at all, it can be found out that all of the communication terminals have received normally.

Still furthermore, in the communication control apparatus of the present invention, at the time of multiple address communication using the IFR control code, since the IFR is replied only by the unit having the source address which is mathematically larger than the IFR control code, or the unit having the source address which is mathematically smaller, when the multiple address communication is repeated while changing the IFR control code sequentially, respective source addresses and the number of communication terminals connected to the common data line can be retrieved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A communication control apparatus, which is included respectively in a plurality of communication terminals connected to a common data line so as to transmit data from one terminal functioning in a transmitting mode to any other terminal functioning in a receiving mode, and which transmits and receives communication data by a set of data bytes constituting a packet frame on said common data line, including a series of transmitting data bytes sent to said common data line from the communication terminal functioning in the transmitting mode, and which transmits a reply data byte on said common data line from a communication terminal functioning in a receiving mode acknowledging the transmitting data bytes in a reply section, and which, when functioning in a receiving mode, detects collisions of the reply data byte sent to said common data line by itself on the common data line in the reply section, and stops sending out the reply data byte when collision is detected, comprising:

means for sending said reply data byte only when a packet frame is received normally on said common data line when in a transmitting mode or only when not received normally, when functioning in a receiving mode;

means for storing the reply data byte sent from terminals in the receiving mode, when functioning in a transmitting mode; and means for detecting whether or not the reply data byte has been sent, when functioning in the transmitting mode.

2. A communication control apparatus, which is included respectively in a plurality of communication terminals connected to a common data line for multiple address communication, which transmits data of the same contents from one terminal functioning in a transmitting mode to a plurality of terminals functioning in a receiving mode, and which transmits and receives communication data by a set of data bytes constituting a packet frame on the common data line including a series of transmitting data bytes sent to said common data line from the communication terminal functioning in a transmitting mode, and which transmits a reply data byte on said common data line from a communication terminal functioning in a receiving mode acknowledging the transmitting data bytes in a reply section, and which when functioning in a receiving mode, detects collisions of the reply data byte sent to said common data line by itself on said common data line in the reply section, and stops sending out a reply data byte when collision is detected, comprising:

means for sending the reply data byte, only when receiving normally the series of transmitting data bytes sent to said common data line from a terminal in said transmitting mode or only when not receiving normally, when functioning in the receiving mode;

means for storing the reply data byte sent from a terminal in the receiving mode when functioning in the transmitting mode; and means for detecting whether or not the reply data byte has been sent, when functioning in the transmitting mode.

3. A communication control apparatus, which is included respectively in a plurality of communication terminals connected to a common data line for multiple address communication, which transmits data of the same contents from the one functioning as a transmitting side to the other plurality functioning as receiving sides, and respectively allocated with inherent data for respective identification, transmits and receives communication data by a set of data rows constituted on said common data line, by a series of transmitting data rows sent to said common data line from the communication terminal functioning as the transmitting side in a transmitting section, and a reply data row sent to said common data line from the communication terminal functioning as the receiving side against the transmitting data rows in a reply section, and when functioning as the receiving side, detects collisions of the reply data row sent to said common data line by itself on said common data line in the reply section, and stops to send out the reply data row when the collision is detected, comprising:

means for replying inherent data as the reply data row, only when said respectively allocated inherent data is smaller than a predetermined code included in the receiving data row received from said common data line, whet, functioning as the receiving side;

means for storing the reply data row replied from the receiving side, when functioning as the transmitting side; and means for detecting whether or not the reply data row has been replied, when functioning as the transmitting side.

4. A communication control apparatus, which is included respectively in a plurality of communication terminals connected to a common data line for multiple address communication, which transmits data with the same contents from one terminal functioning in a transmitting mode to the other plurality of terminals functioning in a receiving mode, the terminals being respectively allocated with inherent data for respective identification, which transmits and receives communication data by a set of data bytes constituting a packet frame on the common data line, by a series of transmitting data bytes sent to said common data line from a communication terminal functioning in the transmitting mode, and a reply data byte sent to said common data line from communication terminals functioning in the receiving mode acknowledging the transmitting data bytes in a reply section, and which when functioning in the receiving mode, detects collisions of the reply data byte sent to said common data line by itself on said common data line in the reply section, and stops sending out the data byte when collision is detected, comprising:

means for sending inherent data as the reply data byte, only when said respectively allocated inherent data is larger than a predetermined code included in the receiving data byte received from said common data line, when functioning in the receiving mode;

means for storing the reply data byte sent from terminals in the receiving mode, when functioning in the transmitting mode; and means for detecting whether or not the reply data byte has been sent, when functioning in the transmitting mode.

5. A communication control apparatus, which is included respectively in a plurality of communication terminals connected to a common data line for multiple address communication, which transmits data of the same contents from one terminal functioning in a transmitting mode to the other terminals functioning in receiving modes, and respectively allocated with inherent data for respective identification, which terminal transmits and receives communication data by a set of data bytes constituting a packet frame on the common data line by a series of transmitting data bytes sent to said common data line from the communication terminal functioning in a transmitting mode, and reply data byte sent to said common data line from a communication terminal functioning in the receiving mode acknowledging the transmitting data bytes in a reply section, and which when functioning in a receiving mode detects collisions of the reply data byte sent to said common data line by itself on said common data line in the reply section, and stops sending out the reply data byte when collision is detected, comprising:

reply data byte sending means for sending inherent data as the reply data byte, only when said respectively allocated inherent data is larger or smaller than a predetermined code included in the receiving data byte received from said common data line, when functioning in the receiving mode;

judging means for judging whether to send inherent data by the reply data byte sending means as the reply data byte, according to predetermined data included in receiving data bytes received from said common data line only when said inherent data is larger than said predetermined code, or to send said inherent data as the reply data byte, only when said inherent data is smaller than said predetermined code, when functioning in the receiving mode;

means for storing the reply data byte sent from the receiving side, when functioning in the transmitting mode; and means for detecting whether or not the reply data byte has been sent, when functioning in the transmitting mode.

\* \* \* \* \*